United States Patent [19]

Lew

[11] Patent Number: 4,879,909
[45] Date of Patent: * Nov. 14, 1989

[54] VORTEX SHEDDING FLOWMETER

[76] Inventor: Hyok S. Lew, 7890 Oak St., Arvada, Colo. 80005

[ * ] Notice: The portion of the term of this patent subsequent to Mar. 1, 2005 has been disclaimed.

[21] Appl. No.: 105,265

[22] Filed: Oct. 7, 1987

Related U.S. Application Data

[63] Continuation-in-part of Ser. No. 922,850, Oct. 24, 1986, Pat. No. 4,747,756, and a continuation-in-part of Ser. No. 31,901, Mar. 30, 1987, Pat. No. 4,776,222, and a continuation-in-part of Ser. No. 31,902, Mar. 30, 1987, Pat. No. 4,807,481.

[51] Int. Cl.[4] .............................................. G01F 1/32
[52] U.S. Cl. .................................................. 73/861.24
[58] Field of Search ........... 73/861.22, 861.23, 861.24, 73/DIG. 4

[56] References Cited

U.S. PATENT DOCUMENTS

| 4,069,708 | 1/1978 | Fussell, Jr. | 73/861.24 |
| 4,181,020 | 1/1980 | Herzl | 73/861.24 |
| 4,307,619 | 12/1981 | Herzl | 73/861.24 |
| 4,727,756 | 3/1988 | Lew | 73/861.24 |

Primary Examiner—Stewart J. Levy
Assistant Examiner—Robert P. Bell

[57] ABSTRACT

A flowmeter measuring rate of fluid flow comprises a vortex generator of an elongated bluff body disposed generally perpendicular to the flow direction and a vortex detector of an elongated planar member disposed generally parallel to and downstream of the vortex generator on a plane generally parallel to the flow direction, wherein the vortex sensor is fixedly secured to the wall of flow passage at one extremity and coupled to the force receiving member of an impulse detector at the other extremity. The volume flow is determined from the frequencies of vortex shedding and the mass flow is determined from the amplitude of alternating lift forces on the vortex detector exerted by the vortices, which are obtained by processing and analyzing the electric signals from the impulse detector. As an option, the vortex detector may include an electromagnet exerting a testing force of known magnitude in pulses or alternating modes, from which the proportionality relationship between the lift force on the vortex detector and the amplitude of the output from the impulse detector is calibrated on a real time basis.

22 Claims, 3 Drawing Sheets

VORTEX SHEDDING FLOWMETER

This patent application is a continuation-in-part to the U.S. patent application Ser. No. 922,850 entitled "Vortex Shedding Flowmeter with Lever Action Signal Amplification" filed on Oct. 24, 1986, now U.S. Pat. No. 4,727,756 Ser. No. 031,901 entitled "Impulse Sensor with Mechanical Preamplification" filed on Mar. 30, 1987, now U.S. Pat. No. 4,776,222 and Ser. No. 031,902 entitled "Three-In-One Vortex Shedding Flowmeter" filed on Mar. 30, 1987, now U.S. Pat. No. 4,807,481.

The existing vortex shedding flowmeters measure only the volume flow and are not capable of measuring low velocity fluid flows. For example, the best of the existing vortex shedding flowmeters fails to measure air flows under the standard conditions lower than 20 to 25 feet per second and water flows lower than 1 to 2 feet per second. It is well known that the vortex shedding phenomena occur in fluid flows of very low velocities in a highly regular and clear pattern such as air flows of a few feet per second velocity and water flows of a fraction of a foot per second velocity.

The primary object of the present invention is to provide a vortex shedding flowmeter capable of measuring fluid flows in a wide ranges, e.g., air flows as low as 5 to 10 feet persecond and water flows as low as 0.1 to 0.3 feet per second.

Another object is to provide a vortex shedding flowmeter that measures mass flow rates as well as the volume flow rates.

A further object is to provide a vortex shedding flowmeter that measures fluid density.

Yet another object is to provide a vortex shedding flowmeter comprising a vortex detector of an elongated planar member fixedly secured to the flow passage wall at one extremity and connected to a lever member at the other extremity, which lever member is coupled to the force receiving member of an impulse detector in a flexible arrangement.

Yet a further object is to provide a vortex shedding flowmeter comprising a vortex detector of an elongated planar member secured to the flow passage wall at one extremity and connected to a lever member at the other extremity, which lever member includes a strain or motion detector contained therein or coupled therewith.

Still another object is to provide a vortex shedding flowmeter comprising a vortex detector of an elongated planar member fixedly secured to the flow passage wall at one extremity and flexibly connected to the force receiving member of an impulse detector.

Still a further object is to provide a vortex shedding flowmeter comprising an electromagnet exerting impulses of known magnitude on the vortex detector, from which the proportionality relationship between the magnitude of the lift forces generated by the vortices and the amplitude of the transducer output is calibrated on a real time basis.

These and other objects of the present invention will become clear as the description thereof proceeds.

The present invention may be described with a great clarity and specificity by referring to the following figures.

The present invention teaches the following new principles which are superior in structures and functions and patentably different compared with the existing arts: Firstly, in the present invention, the vortex detector is fixedly secured to the wall of flow passage, which arrangement keeps the resonance frequency far above the operating range of the vortex shedding frequencies and, consequently, it allows the use of a flexible coupling between the vortex detector and the force receiving member of the transducer, that provides a greater sensitivity in detecting low intensity vortices. In existing arts, the vortex detector is flexibly secured to the wall of flow passage while it is rigidly coupled to the force receiving member of the transducer, which is precisely the reverse of the present invention. The fixed coupling of the vortex detector to the force receiving member of the transducer practiced in the existing arts requires much greater threshhold force that can be detected by the transducer at the minimum level as the major portion of the force is absorbed by the fixed coupling and only a small portion is transmitted to the transducer, while the flexible coupling of the vortex detector to the force receiving member of the transducer as taught by the present invention transmits most of the force to the transducer and, consequently, the flexible coupling of the present invention enables it to detect vortices with intensities far bellow the lower limit measurable with the existing arts. Secondly, the present invention makes it possible to employ a wing of the optimum chord length as the vortex detector. The ideal width of the bluff body employed as the vortex generator is equal to a quarter of the flow passage diameter. The wave length of the sinuating stream lines created by the vortices shed from the two sides of the bluff body in an alternating pattern is approximately equal to eight times the bluff body width. Consequently, the optimum chord length of the vortex detecting wing is equal to three to four times the width of the bluff body, e.g., the diameter of the flow passage. In the existing arts, the vortex sensing wing fixedly connected to the transducer has to extend through a hole included in the flow passage wall. The disturbance on the fluid flow and impracticality in manufacturing limit the size of the hole through the wall of the flow passage to one half of the diameter of the flow passage. Therefore, the chord length of the vortex sensing wing is limited to one half of the optimum value in the existing arts, while the vortex sensing wing of the present invention installed through the flow passage opening has the optimum chord length equal to the diamter of the flow passage. The doubling of the lifting surface area of the vortex sensing wing in the present invention doubles the sensitivity in detecting vortices. Thirdly, the present invention measures the volume flow, mass flow and fluid density, while the existing arts measure only the volume flow. The vortex shedding frequency is proportional to the fluid velocity, which relationship is used in measuring the volume flow in the existing arts as well as in the present invention. The amplitude of the alternating lift forces exerted on the vortex sensing wing is proportional to one half of the square of the fluid velocity times the density of the fluid, which combination is known as the dynamic pressure. In the present invention, the dynamic pressure is determined by measuring the the amplitude of the alternating lift forces on the vortex sensing wing, which yields the mass flux and fluid density when it is divided by the fluid velocity and square thereof, respectively. The combination of the aforementioned novel and patentable principles of the present invention brings forth revolutionarily new and advanced flowmeters, which may be a vortex shedding volumetric flowmeter capable of measuring very low velocity flows as well as high velocity flows or multifunction vortex shedding flowmeters measuring the volume and mass flows and the density of fluid in a wide flow range.

Figure 1:
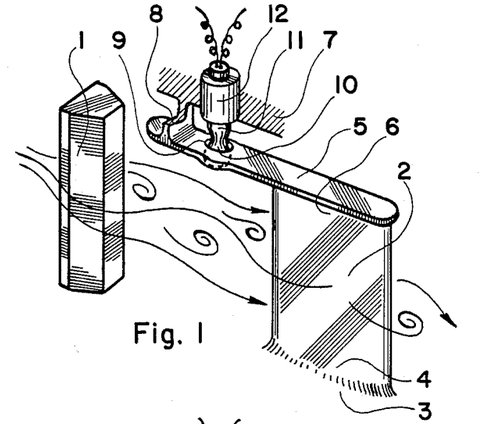
FIG. 1 illustrates an embodiment of the vortex generator-vortex detector combination of the present invention that employs a force transmitter lever with an elastic fulcrum means.

In FIG. 1 there is illustrated a perspective view of an embodiment of the vortex shedding flowmeter of the present invention, which includes a vortex generator, a vortex detector and a transducer. The vortex generator comprises an elongated bluff body 1 disposed within the fluid stream generally perpendicular to the flow direction, which is rigidly secured to the wall of the flow passage at one or both extremities thereof. The vortex detector comprises an elongated planar member 2 disposed generally parallel to and downstream of the bluff body 1, wherein the chord plane of the elongated planar member or wing sensor 2 is generally parallel to the direction of the flow. The wing sensor 2 fixedly secured to the wall 3 of the flow passage at one extemity 4 is connected to a force transmitter lever 5 at the other extremity 6. The force transmitter lever 5 disposed generally parallel to the flow direction and adjacent to the wall 7 of the flow passage includes a fulcrum means 8 disposed at an extemity thereof opposite to the extremity connected to the wing sensor 2, which fulcrum means couples the transmitter lever 5 to the wall of the flow passage in a pivotable arrangement over a minute angle about an axis generally parallel to the longitudinal axis of the bluff body 1. In this particular embodiment, the fulcrum means 8 comprises a flat elastic member disposed on a plane generally perpendicular to the chord plane of the wing sensor and fixedly secured to the transmitter member 5 at one extremity and to the wall 7 of the flow passage at the other extremity. The midsection of the transmitter lever 5 includes a socket 9 engaged by a ball end 10 of the force receiving member 11 extending from a thin flange constituting the closed end of the transducer container vessel 12 that contains the transducer element, which may be a stress detecting or strain detecting element. The ball and socket joint coupling the force transmitter lever 5 and the force receiving member 11 may be substituted with other types of swivel or flex joint commonly practiced in the art of flexible coupling.

The vortices shed from the two sides of the bluff body in an alternating pattern create sinuating streamlines trailing the bluff body wherein the wave length of the sinuating streamlines is equal to the fluid velocity U divided by the frequency of the vortex shedding f. It is well known that the frequency of the vortex shedding f is proportional to the fluid velocity U. Consequently, the wave length of the sinuating streamlines is generally a constant that is independent of the fluid velocity. The wing sensor 2 immersed in the sinuating stream lines experiences alternating lift forces changing directions at the same frequency as that of the vortex shedding. The alternating lift forces on the wing sensor 2 or lateral deflections resulting therefrom are transmitted to the transducer elements contained in the transducer container vessel 12 through the force transmitter lever 5 and the force receiving member 11. The transducer elements convert mechanical signals from the wing sensor 2 to electrical signals, which are processed and analyzed by an electronic analyzer. The fluid velocity U is proportional to the vortex shedding frequency f in a wide range of fluid velocities including most industrial and domestic flow measurements. The proportionality relationship between the fluid velocity and the vortex shedding frequency is determined empirically during flowmeter calibration. The vortex shedding flowmeter of the present invention determines the fluid velocity or volume flow rate from the vortex shedding frequency detected by analyzing the electric signals from the transducer, which electric signals are generated by the alternating lift forces on the wing sensor 2. The amplitude of the alternating lift forces on the wing sensor 2 is generally proportional to the square of the fluid velocity times the fluid density. The amplitude of the electric signals from the transducer may be a linear or quasi-linear function of the amplitude of the alternating lift forces on the wing sensor 2 depending on the electromechanical characteristics of the coupling between the wing sensor and the transducer, which functional relationship is determined empirically during flowmeter calibration. The vortex shedding flowmeter of the present invention determines mass flow rate from the amplitude of the alternating lift forces on the wing sensor as the mass flow rate is proportional to the dynamic pressure divided by the fluid velocity. The dynamic pressure is determined from the amplitude of the alternating lift forces on the wing sensor based on an empirical relationship determined during claibration of the flowmeter, while the fluid velocity is determined from the frequency of the alternating lift forces. Of course, the vortex shedding flowmeter of the present invention determines the fluid density as the ratio of the dynamic pressure to one half of the square of the fluid velocity. The vortex shedding flowmeter of the present invention may measure volume flow, mass flow and fluid density simultaneously, or any one or two of the three flow variables depending on the functional and economic requirements of the users.

Figure 2:
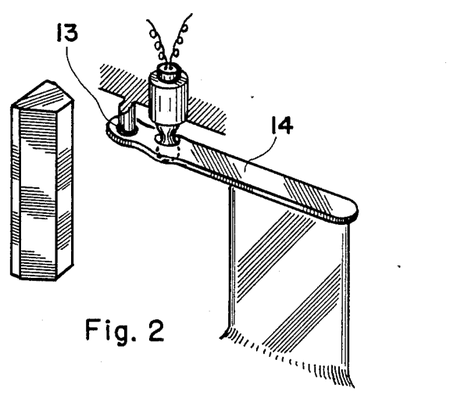
FIG. 2 illustrates an embodiment of the vortex generator-vortex detector combination of the present invention employing a force transmitter lever with a pivoting fulcrum means.

In FIG. 2 there is illustrated an embodiment having essentially the same elements and constructions as the embodiment shown in FIG. 1 with one exception. The fulcrum means 13 of the force transmitter lever 14 comprises a pivotal joint that allows free pivoting movements about an axis generally parallel to the longitudinal axis of the bluff body.

Figure 3:
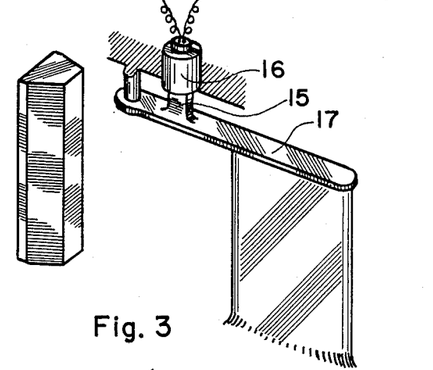
FIG. 3 illustrates an embodiment of the vortex generator-vortex detector combination of the present invention employing a flexible force receiving member of the transducer fixedly connected to the force transmitter lever.

In FIG. 3 there is illustrated an embodiment having essentially the same elements and constructions as the embodiment shown in FIG. 2 with one exception. The force receiving member 15 extending from one closed end of the transducer container vessel 16 comprises a elastic flat bar fixedly connected to the force transmitter lever 17 at the extremity thereof. The various types of flucrum means and joints coupling the force transmitter lever and the force receiving member illustrated in FIGS. 1-3 may be used in other combinations not shown in the illustrated embodiments.

Figure 4:
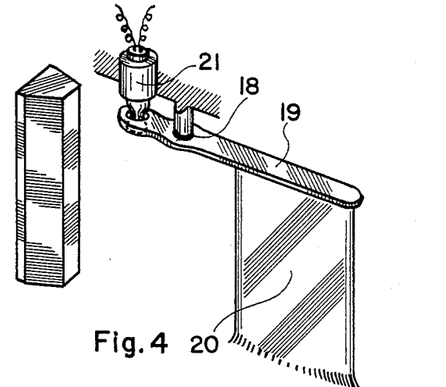
FIG. 4 illustrates an embodiment of the vortex generator-vortex detector combination of the present invention employing a force transmitter lever with a fulcrum means disposed at a midsection thereof.

In FIG. 4 there is illustrated an embodiment of the vortex shedding flowmeter of the present invention similar to the embodiment shown in FIG. 2 with one exception being that the fulcrum means 18 of the force transmitter lever 19 is disposed intermediate the two extremities of the force transmitter lever respectively connected to the wing sensor 20 and the transducer pack 21. The specific type of the joint between the force transmitter lever and the force receiving member and the type of the fulcrum means may be one of those described in conjuction with FIGS. 1-3 or other types commonly employed as a force transmitting joints in the practice of art.

Figure 5:
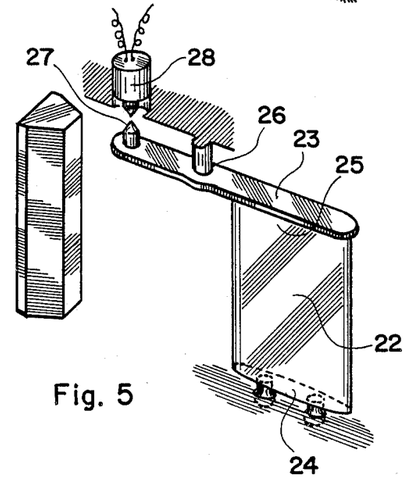
FIG. 5 illustrates an embodiment of the vortex generator-vortex detector combination of the present invention employing a force transmitter lever combined with a motion detector.

In FIG. 5 there is illustrated an embodiment of the vortex shedding flowmeter of the present invention, which employs the combination of the wing sensor 22 and the transmitter lever 23 supported in a free-pivoting arrangement. One extemity 24 of the wing sensor is simply supported by the wall of the flow passage wherein the wing sensor is allowed to pivot freely about an axis generally parallel to the flow direction, while the other extremity 25 is connected to the transmitter lever 23 including a free-pivoting fulcrum means 26 disposed at the midsection thereof. The extremity of the transmitter lever 23 opposite to that connected to the wing sensor 22 includes a motion detecting target 27. The motion detector 28 detects the oscillatory movements of the target 27 created by the alternating lift forces on the wing sensor 22. The wing sensor of the embodiments shown in FIGS. 1-4 is fixedly supported at one extremity and, consequently, with wing sensor-transmitter lever combination has a high resonance frequency due to the fixed support of the wing sensor. The resonance frequency, which is far above the vortex shedding frequency range, is blocked out by the electronic filter included in the electronic processor that analyzes the signals from the transducer. The wing sensor of the embodiment shown in FIG. 5 has zero or very low resonance frequency because it has zero eleastic stiffness and, consequently, zero or very low resonance frequency does not interfere with the vortex shedding frequencies.

Figure 6:
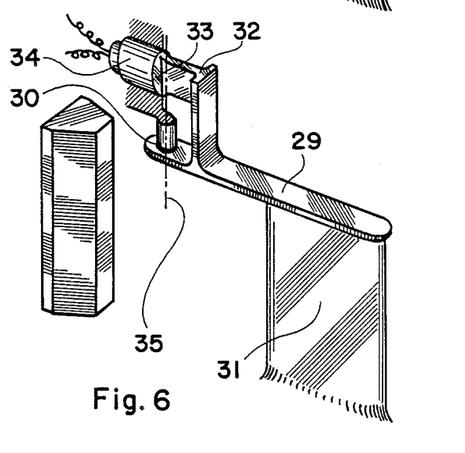
FIG. 6 illustrates an embodiment of the vortex generator-vortex detector combination of the present invention employing a force transmitter lever coupled to a torsion or torque detector.

In FIG. 6 there is illustrated an embodiment of the vortex shedding flowmeter of the present invention, which has elements and constructions similar to the embodiment shown in FIG. 3. The force transmitter lever 29 includes a pivoting fulcrum means 30 disposed at an extremity opposite to that secured to the wing sensor 31. An angled force receiving member 32 extending from a thin flange 33 constituting the closed end of the transducer container vessel 34 is connected to the force transmitter lever 29. The maximum sensitivity can be obtained by disposing the flange 33 included in the container vessel 34 on a plane generally including the pivoting axis 35 of the pivoting fulcrum means 30.

Figure 7:
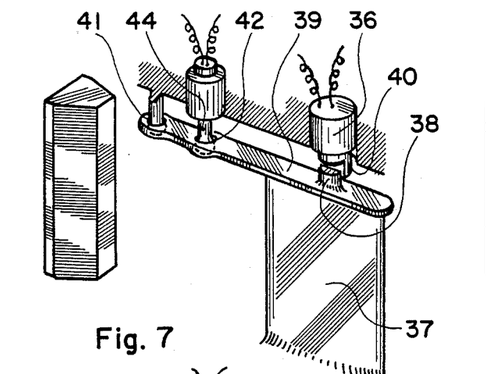
FIG. 7 illustrates an embodiment of the vortex generator-vortex detector combination of the present invention including an electromagnet exerting impulses of known magnitude on the vortex detector for calibrating the proportionality relationship between the magnitude of the lift force and the amplitude of the transducer output.

In FIG. 7 there is illustrated an embodiment of the vortex shedding flowmeter of the present invention that includes means for calibrating the measurement of the amplitude of the alternating lift forces on the wing sensor on an intermittent or real time basis. The vortex shedding phenomena are intrinsic to the fluid flow and, consequently, the determination of the fluid velocity from the vortex shedding frequency does not include any implicit source of error. On the other hand, while the amplitude of the alternating lift forces created by the vortex shedding phenomena are intrinsic to the fluid flow, the measurement thereof includes a source of potential error that arises from the changes in the electro-mechanical charateristics of the coupling between the wind sensor and the transducer. In other words, the relationship between the amplitude of the lift forces on the wing sensor and the amplitude of the transducer output can change as the mechanical characteristics of the wing sensor and the mechanical coupling to the transducer change due to aging, wear and other effects. The electromagnet 36 exerts lateral forces of known magnitude on the wing sensor in intermittent or continuous pulses as the ferromagnetic element 38 affixed to the combination of the wing sensor 37 and the transmitter lever 39 is attracted to the core 40 of the electromagnet 36 that is terminated at a close proximity to the ferromagnetic element 38 in a lateral relationship therebetween. The electronic data processor takes the ratio of the magnitude of the lateral force on the wing swnsor exerted by the electromagnet 36 to the amplitude of the transducer output generated by the lateral force, wherein that ratio is then multiplied to the amplitude of the transducer output generated by the vortices in measuring the true amplitude of the alternating lift forces on the wing sensor 37. As a consequence, the embodiment of the vortex shedding flowmeter of the present invention shown in FIG. 7 accurately determines mass flow rates from the amplitude of the transducer outputs. The specific designs of the fulcrum means 41 and the coupling between the force transmitter lever 43 and the force receiving member 44 may employ one of the various types shown in FIGS. 1–6.

Figure 8:
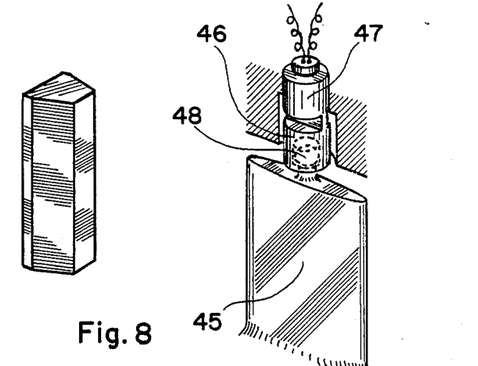
FIG. 8 illustrates an embodiment of the vortex generator-vortex detector combination including a flexible joint coupling the vortex detector and the force receiving member of the transducer.

In FIG. 8 there is illustrated an embodiment of the vortex shedding flowmeter of the present invention, which employs the flexible or swivel joint coupling the wing sensor and the transducer without using a force transmitter lever. One extremity of the wing sensor 45 is fixedly secured to the wall of the flow passage, while the other extremity is coupled to the force receiving member 46 extending from the closed end of the transducer container vessel 47 by a ball and socket coupling 48. The ball and socket coupling 48 includes a ball joint affixed to the wing sensor 45, that engages a socket included in the force receiving member 46, which extends from a thin flange constituting the closed end of the transducer container vessel 47. The ball and socket coupling shown in the particular embodiment may be replaced with other types of pivoting or flexible couplings. The flexible joint 48 coupling the wing sensor 45 and the force receiving member 46 provides a superior sensitivity in detecting low intensity vortices, as the alternating lift forces on the wing sensor of even very small magnitude tend to create significant flexural movements at the flexible joint and, consequently, transmits the alternating lift forces to the force receiving member 46. The fixed connection of one extremity of the wing sensor 45 to the wall of the flow passage provides a high resonance frequency of the wing sensor existing far above the vortex shedding frequency range. The vortex shedding flowmeter shown in FIG. 8 operates on the same principles as those described in conjunction with FIG. 1.

Figure 9:
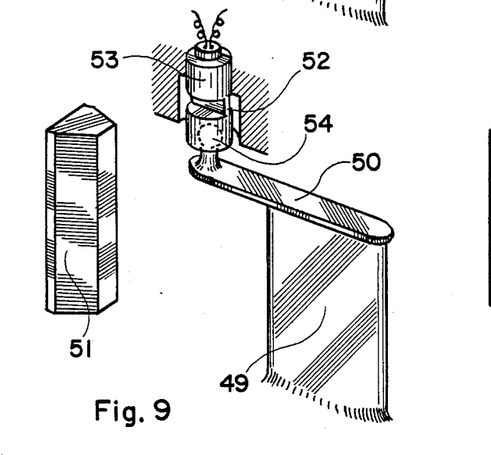
FIG. 9 illustrates an embodiment of the vortex generator-vortex detector combination including a flexible joint coupling an extension of the vortex detector and the transducer.
Figure 10:
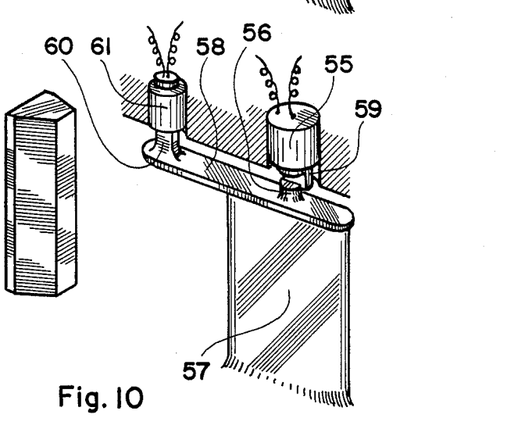
FIG. 10 illustrates an embodiment of the vortex generator-vortex detector combination including an electromagnet impulse generator for calibration purpose.

In FIG. 9 there is illustrated an embodiment of the vortex shedding flwmeter of the present invention similar to the embodiment shown in FIG. 8 with one exception. The wing sensor 49 fixedly secured to the wall of the flow passage at one extremity includes an angled extension 50 extending from the other extremity towards the vortex generating bluff body 51 in a direction generally parallel to the flow direction. The extremity of the angled extension 50 is coupled to the force receiving member 52 extending from the transducer container vessel 53 by a flexible joint 54 such as a ball and socket joint as shown in the particular embodiment or an elastic bar joint as shown in FIG. 10. In order to detect the frequency and intensity of the vortices by means of the alternating lift forces on the wing sensor 49, the wing sensor 49 must be located downstream of the bluff body 51 outside the wake of the dead flow zone. The embodiment shown in FIG. 9 makes it possible to dispose the wing sensor 49 at a desired downstream location while keeping the transducer pack located in the midsection of the flowmeter. It should be mentioned that, in an embodiment such as the one shown in FIG. 8, it may be desirable to dispose the wing sensor in a parallel and slightly offset relationship with respect to the bluff body in order to avoid the wake of the dead flow zone.

In FIG. 10 there is illustrated an embodiment of the vortex shedding flowmeter of the present invention that includes an electromagnet 55 for the same calibration purpose as that described in conjunction with FIG. 7. The ferromagnetic element 56 affixed to the combination of the wing sensor 57 and the angled extension 58 is attracted to the core 59 of the electromagnet 55 when it is energized with a pulse of electric currents of known amount. In this particular embodiment, the extremity of the angled extension 58 is connected to the force receiving member 60 of a flattened elastic bar construction extending from the transducer container vessel 61. The flexible joint coupling the angled extension to the transducer pack may be a free-flexing joint such as a ball and socket joint instead of the elastic bar coupling shown in the particular embodiment. The vortex sheeding flowmeter shown in FIG. 10 operates on the same principles as those described in conjunction with FIG. 7.

Figure 11:
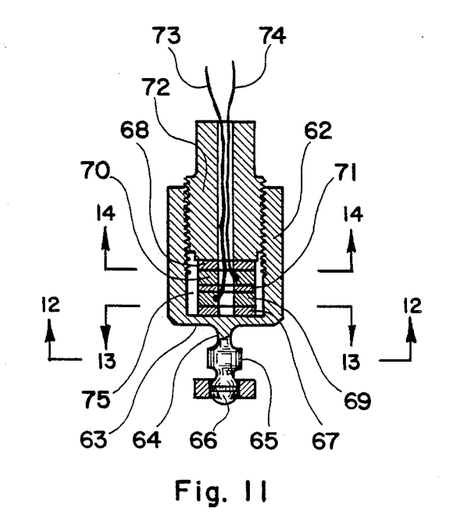
FIG. 11 illustrates a cross section of an embodiment of the impulse detector of the present invention.

In FIG. 11 there is illustrated a cross section of a preferred embodiment of the transducer pack that is ideal for the flowmeter embodiments shown in FIGS. 1–10. The transducer pack includes the container vessel 62 with a closed end comprising a thin flange 63 having a reinforcing rib 64 disposed thereacross on a plane generally parallel to the flow direction. The force receiving member 65 extends from the rib 64 and is coupled to the wing sensor directly or via the force transmitter lever or the angled extension by a flexible joint 66. The transducer container vessel 62 contains a pair of Piezo electric discs 67 and 68, and a pair of conductor discs 69 and 70 respectively in contact with the two Piezo electric discs and insulated electrically from one another by a dielectric disc 71, which elements of a coaxial assembly are under a pressurized contact with the thin flange 63 as the assembly is compressed by a plug 72 threadedly engaging the open end of the container vessel 62. A pair of the conducting wires 73 and 74 respectively extending from the two conductor discs 69 and 70 and routed through a hole included in the plug 72 transmit electric signals generated by Piezo electric discs 67 and 68 to an electronic signal analyzer. The Piezo electric discs packaged into a cylindrical stack are isolated from the cylindrical wall of the container vessel 62 by an annular void space 75 therebetween, which arrangement not only electrically isolates the stack of the transducer elements from the container vessel 62 but also enhances stress transmission from the force receiving member 65 to the transducer elements across the thin flange 63. The alternating lift forces on the wing sensor creates torque or pivoting movements on the force receiving member 65 about an axis generally coinciding with the line of intersection between the thin flange 63 and the reinforcing rib 64. It should be understood that the use of the Piezo electric discs packaged as shown in FIG. 11 is merely one of many transducer arrangements compatible with the flowmeter embodiments shown in FIGS. 1–10. For example, strain gauges affixed to the rib 64 with a sizable height or to the thin flange may be employed in place of the Piezo electric discs.

Figure 12:
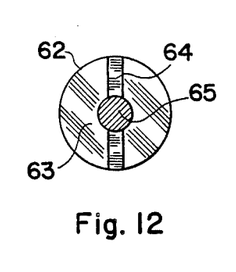
FIG. 12 illustrates another cross section of the impulse detector shown in FIG. 11.

In FIG. 12 there is illustrated another cross section of the transducer pack shown in FIG. 11, which cross section is taken along plane 12—12 as shown in FIG. 11. The rib 64 disposed across and built on the thin flange 63 prevents the sagging of the thin flange 63 under the pressure loading exerted by the threaded plug 72 without hindering the pivoting movements of minute magnitude of the force receiving member 65 about an axis generally coinciding with the line of intersection between the thin flange 63 and the rib 64. It is important to line up the plane including the rib 64 with the chord plane of the wing sensor disposed parallel to the flow direction.

Figure 13:
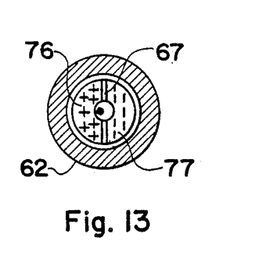
FIG. 13 illustrates a further cross section of the impulse detector shown in FIG. 11.

In FIG. 13 there is illustrated a further cross section of the transducer pack shown in FIG. 11, which cross section is taken along plane 13—13 as shown in FIG. 11. The Piezo electric disc 67 comprises two oppositely polarized Piezo electric elements 76 and 77 disposed in a geometrically symmetric arrangement about the plane including the rib 64. One side of each of the two Piezo electric elements 76 and 77 is in physical and electrical contact with the conductor disc 69, while the other sides are grounded to the thin flange 63 of metallic construction.

Figure 14:
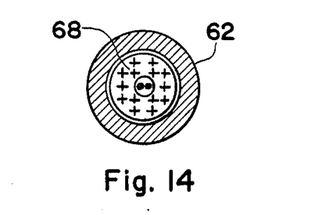
FIG. 14 illustrates yet another cross section of the impulse detector shown in FIG. 11.

In FIG. 14 there is illustrated yet another cross section of the transducer pack shown in FIG. 11, which cross section is taken along plane 14—14 as shown in FIG. 11. The Piezo electric disc 68 comprises a single Piezo electric element disposed symmetrically about the plane including the rib 64. One side of the Piezo electric disc 68 is in physical and electrical contact with the conductor disc 70, while the other side is grounded to the metallic plug 72.

The mechanical vibrations of the flowmeter components generate electromotive forces of opposite signs from the two oppositely polarized halves 76 and 77 of the first Piezo electric disc 67, which cancel one another, while the torque or pivoting motion of the force receiving member 65 resulting from the alternating lift forces on the wing sensor generates electromotive forces of the same signs from the two oppositely polarized halves of the Piezo electric disc 67, which add up to become electric signals representing the vortex shedding phenomena. If the two halves of the first Piezo electric disc 67 are accurately symmetric in geometry and perfectly antisymmetric in polarization, then the first Piezo electric disc 67 would pick up vortex signals only and no noises from the mechanical vibration. In reality, such a perfection can not be accomplished and the first Piezo electric disc 67 picks up mostly vortex signals and a small amount of the noises associated with mechanical vibrations. The vortex shedding phenomena generate electromotive forces of opposite signs from the two identically polarized halves of the second Piezo electric discs 68, which cancel one another, while the mechanical vibrations generate electromotive forces of the same signs from the two halves of the Piezo electric disc 68, which add up to become the noise signals. Therefore, the second Piezo electric disc picks up mostly noises and little vortex signal. The electromotive forces from the two Piezo electric discs are combined in such a way that the noises are canceled and the pure vortex signals are obtained and, then analyzed by an electronic signal analyzer to obtain the frequency and amplitude of the alternating lift forces on the wing sensor, from which the volume flow and/or mass flow and/or fluid density are determined.

Figure 15:
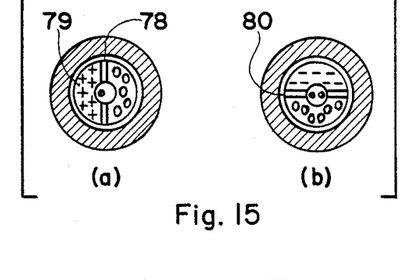
FIG. 15 illustrates another combination of the Piezo electric elements congruous with the impulse detector shown in FIG. 11.

In FIG. 15 there is illustrated another combination of the two Piezo electric discs packaged in the same arrangement as that shown in FIG. 11. The cross section (a) equivalent to the cross section shown in FIG. 13 shows the first Piezo electric disc 78 disposed asymmetrically about the plane including the reinforcing rib of the thin flange, which may be a a circular disc having only one half 79 thereof is polarized. The cross section (b) equivalent to the cross section shown in FIG. 14 shows the second Piezo electric disc 80 disposed symmetrically about the plane including the reinforcing rib, which may be a circular disc having only one half thereof is polarized as shown or one with the same polarization for both halves. The first Piezo electric disc 78 picks up vortex signals as well as the vibration noises, while the second Piezo electric disc 80 picks up mostly vibration noises. The signals from the two Piezo electric discs 78 and 80 are combined in such a way that the vibration noises are cancelled and pure vortex signals are obtained.

Figure 16:
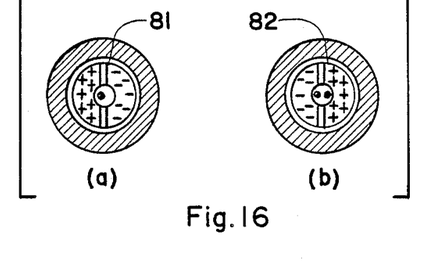
FIG. 16 illustrates a further combination of the Piezo electric elements congruous with the impulse detector shown in FIG. 11.

In FIG. 16 there is illustrated a further combination of the two Piezo electric discs 81 and 82 packaged in the same arrangement as that shown in FIG. 11. Both Piezo electric discs have two oppositely polarized halves disposed symmetrically about the plane including the reinforcing rib. The two Piezo electric discs face one another in an elecrtrically antisymmetric arrangement about the plane including a dielectric disc corresponding to the element 71 shown in FIG. 11. The two Piezo electric discs 81 and 82 generate electro-motive forces of opposite signs associated with the vortex shedding only. The differential electro motive forces between the two Piezo electric discs 81 and 82 are analized to obtain the frequency and amplitude of the alternating lift forces on the wing sensor.

Figures 17, 18, 19, 20, 21, 22:
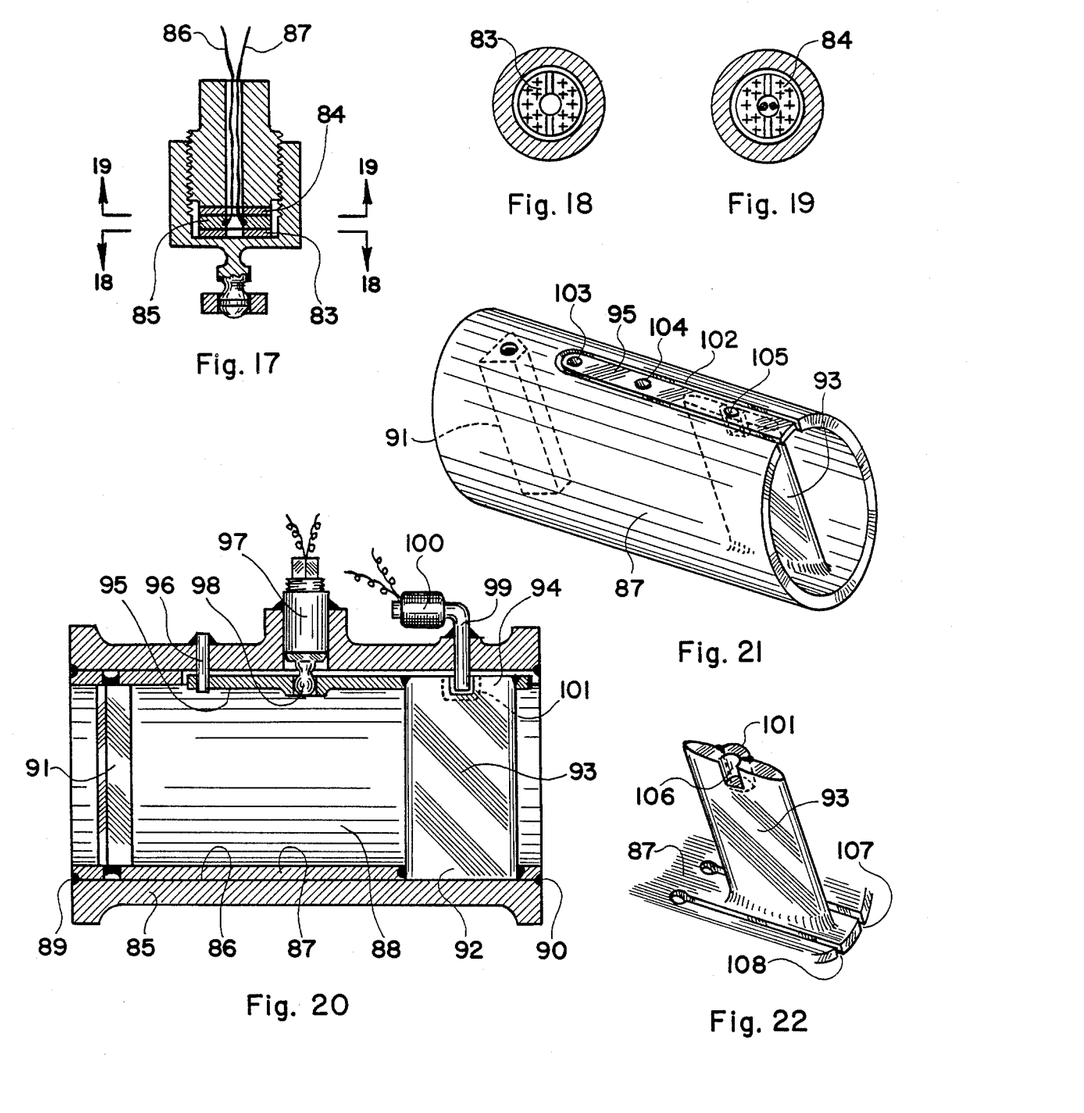
FIG. 17 illustrates a cross section of another embodiment of the impulse detector of the present invention.
FIG. 18 illustrates another cross section of the impulse detector shown in FIG. 17.
FIG. 19 illustrates a further cross section of the impulse detector shown in FIG. 17.
FIG. 20 illustrates a cross section of a preferred embodiment for packaging the various combinations of the vortex generator and the vortex detector of the present invention into a flowmeter having an integral structure.
FIG. 21 illustrates a perspective view of the sleeve tubing employed in the construction of the flowmeter shown in FIG. 20.
FIG. 22 illustrates a cut-out view of the vortex detector included in the combination shown in FIG. 21.

In FIG. 17 there is illustrated a cross section of another embodiment of the transducer pack having the same elements and constructions as that shown in FIG. 11 with one exception. The two Piezo electric discs 83 and 84 are separated from one another by a conducting disc 85 split into two halves insulated electrically from one another. The wires 86 and 87 respectively extending from the two halves of the conducting discs 85 transmit electrical signals generated by two halves of the combination of the two Piezo electric discs to an electronic signal analyzer.

In FIG. 18 there is illustrated another cross section of the transducer pack shown in FIG. 17, which cross ection is taken along plane 18—18 as shown in FIG. 17. The first Piezo electric disc 83 includes two halves of the same polarization and, consequently, it can be a single Piezo electric element.

In FIG. 19 there is illustrated a further cross section of the transducer pack shown in FIG. 17, which cross section is taken along plane 19—19 as shown in FIG. 17. The second Piezo electric disc 84 having two halves of the same polarization can be an undivided single Piezo electric disc. The two Piezo electric discs 83 and 84 are disposed in an electrically symmetric face to face arrangement across the conducting disc 18 divided into two halves insulated from one another. The differential electro motive forces between the two halves of the conducting disc 85 are analyzed by an electronic signal analyzer in obtaining the frequency and the amplitude of the alternating lift forces on the wing sensor.

In FIG. 20 there is illustrated a cross section of an embodiment of an in-line vortex shedding flowmeter of the present invention, which shows the structural arrangement incorporating the principles and elements described in conjuntion with FIGS. 1—10. The flowmeter body 85 includes a bore 86 that receives a sleeve tubing 87 in a close tolerance that provides the flow passage 88. The sleeve tubing 87 is secured to the flowmeter body by weldings 89 and 90. The vortex generating bluff body 91 is secured to the sleeve tubing 87 by weldings applied to the two extremities thereof. One extremity 92 of the wing sensor 93 is fixedly secured to the sleeve tubing 87 by welding, while the other extremity 94 is connected to the force transmitter lever 95 by welding. The force transmitter lever 95 is disposed in an elongated cutout included in the wall of the sleeve tubing 87. The pin 96 extending through a hole in the wall of the flowmeter body engages a hole included in the transmitter lever 95, which combination provides pivoting fulcrum. The transducer container vessel 97 is secured to the flowmeter body wherein the ball end of the force receiving member 98 extending through the wall of the flowmeter body engages the socket included in the transmitter lever 95, which combination provides the flexible joint coupling the transmitter lever 95 to the force receiving member 98. the core 99 of the calibration electromagnet 100 extends through holes in the flowmeter body and the transmitter lever 95 and is terminated adjacent to the ferromagnetic element 101 affixed to the wing sensor 93. The particular arrangement of the electromagnet 100 and accessories thereof are feasible when the flowmeter body 85 is made of a nonferro-magnetic material such as the 300 series stainless steel. The members extending through holes in the flowmeter body may be secured to the flowmeter body in leak-proof manners by mechanical fastening means such as weldings or threaded fastenings. A vortex shedding flowmeter measuring only the volume flow would not require the calibration electromagnet 100 and accessories thereof. It is quite clear that the structural design shown in FIG. 20 can be easily modified to incorporate an embodiment shown in FIG. 8, 9, or 10. It should be understood that the combination of the sleeve tubing 87, the wing sensor 93 and the force transmitter lever 95 may be cast or formed in a single integral assembly instead of the weld connected assembly. The pivoting fulcrum and the swivel joint between the force transmitter lever 95 and the force receiving member 98 may be welded to convert them to an elastic fulcrum and elastic joint, respectively, as such welds can be made by an welding tool inserted into the flow passage 88.

In FIG. 21 there is illustrated a perspective view of the sleeve tubing 87 that includes the bluff body 91, the wing sensor 93 and the force transmitter lever 95 disposed in an elongated cutout 102 in the wall of the sleeve tubing 87, which combination is ready to be inserted into the bore 86 included in the flowmeter body 85.

The holes 103, 104 and 105 included in the transmitter lever 95 are for receiving the fulcrum pin 96, the force receiving member 98 and the core 99 of the calibration electromagnet 100, respectively. It is readiy recognized that the particular design of the structural arrangement makes it possible to incorporate a wing sensor of any chord length.

In FIG. 22 there is illustrated a cutout view showing the wing sensor 93 hypothetically separated from the force transmitter lever 95. The ferromagnetic element 101 weld-connected to the wing sensor 93 has a groove 106 receiving the extremity of the core 99 of the calibration electromagnet 100 in a spaced relationship. As an option, a pair of slits 107 and 108 may be included in the wall of the sleeve tubing 87, which are disposed adjacent to the two opposite sides of the wing sensor 93. Such slits of varying lengths are used to adjust the resonance frequency of the wing sensor 93. For example, a vortex shedding flowmeter measuring liquid flows can have a resonance frequency much lower than that of a vortex shedding flowmeter measuring gas flows. The vortex shedding flowmeter designed for measuring gas flows can be readily converted to that measuring liquid flows by incorporating the slits 107 and 108 of desired length.

While the principles of the present invention have now been made clear by the illustrated embodiments, there will be immediately obvious modifications of the structures, arrangements, proportions, elements and materials, which are particularly adapted to the specific working environments and operating conditions in the practice of the invention without departing from those principles.

The embodiment of the invention in which an exclusive property or priviledge is claimed are defined as follows:

1. An apparatus for measuring fluid flow comprising in combination:
   (a) a body including a flow passage extending from one extremity to the other extremity of the body;
   (b) a vortex generator of an elongated cylindrical shape disposed across a first cross section of the flow passage; and
   (c) a vortex detector comprising a planar member disposed across a second cross section of the flow passage generally parallel to the vortex generator on a plane generally parallel to the central axis of the flow passage wherein one extremity of the planar member is secured to the wall of the flow passage, a lever member including a fulcrum means disposed generally parallel to the central axis of the flow passage with one extremity connected to the other extremity of the planar member opposite to said one extremity, and a transducer means including a force receiving member connected to the lever member;

wherein said transducer means provides signals related to the frequencies of vortex shedding from the vortex generator as a measure of volume flow rate through the flow passage and the amplitudes of alternating lift forces on the planar member as a measure of mass flow rate through the flow passate.

2. The combination as set forth in claim 1 wherein the ratio of the amplitude to the frequency of the alternating lift forces on the planar member is used as a measure of the density of fluid moving through the flow passage.

3. The combination as set forth in claim wherein said combination includes an electromagnet intermittently exerting a lateral force of known magnitude on the combination of the planar member and the lever member, from which the ratio of the amplitude of signals from the transducer means to the magnitude of the forces on the planar member is determined for calibration purposes.

4. An apparatus for measuring fluid flow comprising in combination:
   (a) a body including a flow passage extending from one extremity to the other extremity of the body;
   (b) a vortex generator of an elongated cylindrical shape disposed across a first cross section of the flow passage; and
   (c) a vortex detector comprising a planar member disposed across a second cross section of the flow passage generally parallel to the vortex generator on a plane generally parallel to the central axis of the flow passage wherein one extremity of the planar member is secured to the wall of the flow passage, a lever member including a fulcrum means disposed generally parallel to the central axis of the flow passage with one extremity connected to the other extremity of the planar member opposite to said one extremity, and a transducer means including a force receiving member connected to the lever member by a free-flexing joint;

wherein said transducer means provides signals related to the frequencies of vortex shedding from the vortex generator as a measure of fluid flow through the flow passage.

5. An apparatus for measuring fluid flow comprising in combination:
 (a) a body including a flow passage extending from one extremity to the other extremity of the body;
 (b) a vortex generator of an elongated cylindrical shape disposed across a first cross section of the flow passage; and
 (c) a vortex detector comprising a planar member disposed across a second cross section of the flow passage generally parallel to the vortex generator on a plane generally parallel to the central axis of the flow passage wherein one extremity of the planar member is secured to the wall of the flow passage, a lever member including a fulcrum means disposed generally parallel to the central axis of the flow passage with one extremity connected to the other extremity of the planar member opposite to said one extremity, and a transducer means including a force receiving member connected to the lever member by an elastically flexible joint;

wherein said transducer means provides signals related to the frequencies of vortex shedding from the vortex generator as a measure of fluid flow through the flow passage.

6. An apparatus for measuring fluid flow comprising in combination:
 (a) a body including a flow passage extending from one extremity to the other extremity of the body;
 (b) a vortex generator of an elongated cylindrical shape disposed across a first cross section of the flow passage;
 (c) a vortex detector comprising a planar member disposed across a second cross section of the flow passage generally parallel to the vortex generator on a plane generally parallel to the central axis of the flow passage wherein one extremity of the planar member is secured to the wall of the flow passage, and a lever member including a fulcrum means disposed generally parallel to the central axis of the flow passage with one extremity connected to the other extremity of the planar member opposite to said one extremity; and
 (d) a transducer means including at least one Piezo electric element pressed against a thin flange, and a force receiving member extending from the thin flange and connected to the lever member;

wherein said transducer means provides a signals related to the frequencies of vortex shedding from the vortex generator as a measure of fluid flow through the flow passage.

7. An apparatus for measuring fluid flow comprising in combintion:
 (a) a body including a flow passage extending from one extremity to the other extremity of the body;
 (b) a vortex generator of an elongated cylindrical shape disposed across a first cross section of the flow passage; and
 (c) a vortex detector comprising a planar member disposed across a second cross section of the flow passage generally parallel to the vortex generator on a plane generally parallel to the central axis of the flow passage wherein one extremity of the planar member is secured to the wall of the flow passage, and a transducer means including a force receiving member connected to the other extremity of the planar member opposite to said one extremity;

wherein said transducer means provides signals related to the frequencies of vortex shedding from the vortex generator as a measure of volume flow rate through the flow passage and the amplitudes of alternating lift forces on the planar member as a measure of mass flow rate through the flow passage.

8. The combination as set forth in claim 7 wherein the ratio of the amplitude to the frequency of the alternating lift forces on the planar member is used as a measure of the density of fluid through the flow passage.

9. The combination as set forth in claim 7 wherein said combination includes an electromagnet intermittently exerting a lateral force of known magnitude on the planar member, from which the ratio of the amplitude of the signals from the transducer means to the magnitude of the forces on planar member is determined for calibration purposes.

10. An apparatus for measuring fluid flow comprising in combination:
 (a) a body including a flow passage extending from one extremity to the other extremity of the body;
 (b) a vortex generator of an elongated cylindrical shape disposed across a first cross section of the flow passage; and
 (c) a vortex detector comprising a planar member disposed across a second cross section of the flow passage generally parallel to the vortex generator on a plane generally parallel to the central axis of the flow passage wherein one extremity of the planar member is secured to the wall of the flow passage, and a transducer means including a force receiving member connected to the other extremity of the planar member opposite to said one extremity by a free-flexing joint;

wherein said transducer means provides signals related to the frequencies of vortex shedding from the vortex generator as a measure of fluid flow through the flow passage.

11. An apparatus for measuring fluid flow comprising in combination:
 (a) a body including a flow passage extending from one extremity to the other extremity of the body;
 (b) a vortex generator of an elongated cylindrical shape disposed across a first cross section of the flow passage; and
 (c) a vortex detector comprising a planar member disposed across a second cross section of the flow passage generally parallel to the vortex generator on a plane generally parallel to the central axis of the flow passage wherein one extremity of the planar member is secured to the wall of the flow passage, and a transducer means including a force receiving member connected to the other extremity of the planar member opposite to said one extremity by an elastically flexible joint;

wherein said transducer means provides signals related to the frequencies of vortex shedding from the vortex generator as a measure of fluid flow through the flow passage.

12. An apparatus for measuring fluid flow comprising in combination:
   (a) a body including a flow passage extending from one extremity to the other extremity of the body;
   (b) a vortex generator of an elongated cylindrical shape disposed across a first cross section of the flow passage;
   (c) a vortex detector comprising a planar member disposed across a second cross section of the flow passge generally parallel to the vortex generator on a plane generally parallel to the central axis of the flow passage wherein one extremity of the planar member is secured to the wall of the flow passage; and
   (d) a transducer means including at least one Piezo electric element pressed against a thin flange, and a force receiving member extending from the thin flange and connected to the other extremity of the planar member opposite to said one extremity;

wherein said transducer means provides signals related to the frequencies of vortex shedding from the vortex generator as a measure of fluid flow through the flow passage.

13. An apparatus for measuring fluid flow comprising in combination:
   (a) a body including a flow passage extending from one extremity to the other extremity of the body;
   (b) a vortex generator of an elongated cylindrical shape disposed across a first cross section of the flow passage; and
   (c) a vortex detector comprising a planar member disposed across a second cross section of the flow passage generally parallel to the vortex generator on a plane generally parallel to the central axis of the flow passage wherein one extremity of the planar member is secured to the wall of the flow passage and the other extremity of the planar member opposite to said one extremity includes an extension member extending generally parallel to the central axis of the flow passage, and a transducer means including a force receiving member connected to the extension member;

wherein said transducer provides signals related to the frequencies of vortex shedding from the vortex generator as a measure of fluid flow through the flow passage.

14. The combination as set forth in claim 13 wherein said transducer means provides signals relalted to the amplitudes of alternating lift forces on the planar member as a measure of mass flow rate of fluid moving through the flow passage.

15. The combination as set forth in claim 14 wherein the ratio of the amplitude to the frequency of the alternating lift forces on the planar member is used as a measure of the density of fluid moving through the flow passage.

16. The combination as set forth in claim 13 wherein the force receiving member is connected to the extension member by a free-flexing joint.

17. The combination as set forth in claim 13 wherein the force receiving member is connected to the extension member by an elastically flexible joint.

18. The combination as set forth in claim 13 wherein the transducer means includes at least one Piezo electric element under a pressurized contact with a thin flange from which the force receiving member extends.

19. The combination as set forth in claim 14 wherein said combination includes an electromagnet intermittently exerting a lateral force of known magnitude on the combination of the planar member and the extension member, from which the ratio of the amplitude of the signals from the transducer means to the magnitude of the forces on the planar member is determined for calibration purposes.

20. An apparatus for measuring fluid flow comprising in combination:
   (a) a body including a flow passage extending from one extremity to the other extremity of the body;
   (b) a vortex generator of an elongated cylindrical shape disposed across a first cross section of the flow passage; and
   (c) a vortex detector comprising a planar member disposed across a second cross section of the flow passage generally parallel to the vortex generator on a plane generally parallel to the central axis of the flow passage wherein one extremity of the planar member is secured to the wall of the flow passage, a lever member including a fulcrum means disposed generally parallel to the central axis of the flow passage with one extremity connected to the other extremity of the planar member opposite to said one extremity, and a motion detector means for detecting movement of the other extremity of the lever member;

wherein said motion detector means provides signals related to the frequencies of vortex shedding from the vortex generator as a measure of volume flow rate through the flow passage and the amplitude of alternating lift forces on the planar member as a measure of mass flow rate through the flow passage.

21. The combination as set forth in claim 20 wherein the ratio of the amplitude to the frequency of the alternating lift forces on the planar member generated by vortices shed from the vortex generator is used as a measure of the density of fluid moving through the flow passage.

22. The combination as set forth in claim 20 wherein said combination includes an electromagnet for intermittently exerting a lateral force of known magnitude on the combination of the planar member and the lever member, from which the ratio of the amplitude of signals from the motion detector means to the magnitude of the forces on the planar member is determined for calibration purposes.

* * * * *